US006991768B2

(12) United States Patent
Keras et al.

(10) Patent No.: US 6,991,768 B2
(45) Date of Patent: Jan. 31, 2006

(54) APPARATUS AND METHOD FOR THE TREATMENT OF ODOR AND VOLATILE ORGANIC COMPOUND CONTAMINANTS IN AIR EMISSIONS

(75) Inventors: Allan D. Keras, Abbotsford (CA); Douglas P. Lanz, Port Moody (CA)

(73) Assignee: IONO$_2$X Engineering L.L.C., Woodland, WA (US)

(*) Notice: Subject to any disclaimer, the term of this patent is extended or adjusted under 35 U.S.C. 154(b) by 73 days.

(21) Appl. No.: 10/628,686

(22) Filed: Jul. 28, 2003

(65) Prior Publication Data

US 2005/0023128 A1 Feb. 3, 2005

(51) Int. Cl.

*B01J 19/08* (2006.01)
*A62B 7/08* (2006.01)
*H05F 3/00* (2006.01)

(52) U.S. Cl. ............ 422/186; 422/186.07; 422/186.14; 422/186.04; 204/164; 204/176

(58) Field of Classification Search ................ 422/186, 422/186.04, 186.07, 186.14, 5, 120; 204/164, 204/176

See application file for complete search history.

(56) References Cited

U.S. PATENT DOCUMENTS

| | | | | |
|---|---|---|---|---|
| 5,843,288 | A | 12/1998 | Yamamoto | 204/164 |
| 5,855,855 | A | 1/1999 | Williamson et al. | 422/186.04 |
| 5,871,703 | A | 2/1999 | Alix et al. | 423/210 |
| 5,904,905 | A | 5/1999 | Dolezal et al. | 422/186.04 |
| 6,030,506 | A | 2/2000 | Bittenson et al. | 204/164 |
| 6,146,599 | A | 11/2000 | Ruan et al. | 422/186.04 |
| 6,432,280 | B1 | 8/2002 | Bianco et al. | 204/164 |
| 6,451,252 | B1 | 9/2002 | Ruan et al. | 422/22 |
| 2002/0028163 | A1 | 3/2002 | Nelson et al. | 422/186 |
| 2002/0153241 | A1 * | 10/2002 | Niv et al. | 204/164 |
| 2003/0030374 | A1 * | 2/2003 | Pai | 313/582 |

* cited by examiner

*Primary Examiner*—Steven Versteeg
(74) *Attorney, Agent, or Firm*—Thorpe North and Western LLP; Robert R. Mallinckrodt

(57) ABSTRACT

An odor removal system to neutralize odors and VOC emissions in commercial and/or industrial air streams utilizes Non-Thermal Plasma (NTP) to create a range of Reactive Oxygen Species (ROS) to cause the oxidation and/or reduction of odor causing molecules and VOC's. The ROS is generated by drawing atmospheric and/or odorous air through a Dielectric Barrier Discharge Plasma Generation Cell (DBDPGC). The gas is activated by passing it through the non-thermal plasma field in the DBDPGC, producing the ROS that are then immediately mixed into the odorous gas to be treated. If the odorous gas is passing through the NTP field, it is inherently mixed. When large volumes of gas, and/or extremely high odor loads in large gas volumes must be treated, multiple units can be combined in parallel. The DBDPGC has hermetically sealed hot electrodes and may be used in other applications.

28 Claims, 6 Drawing Sheets

Figure 1:
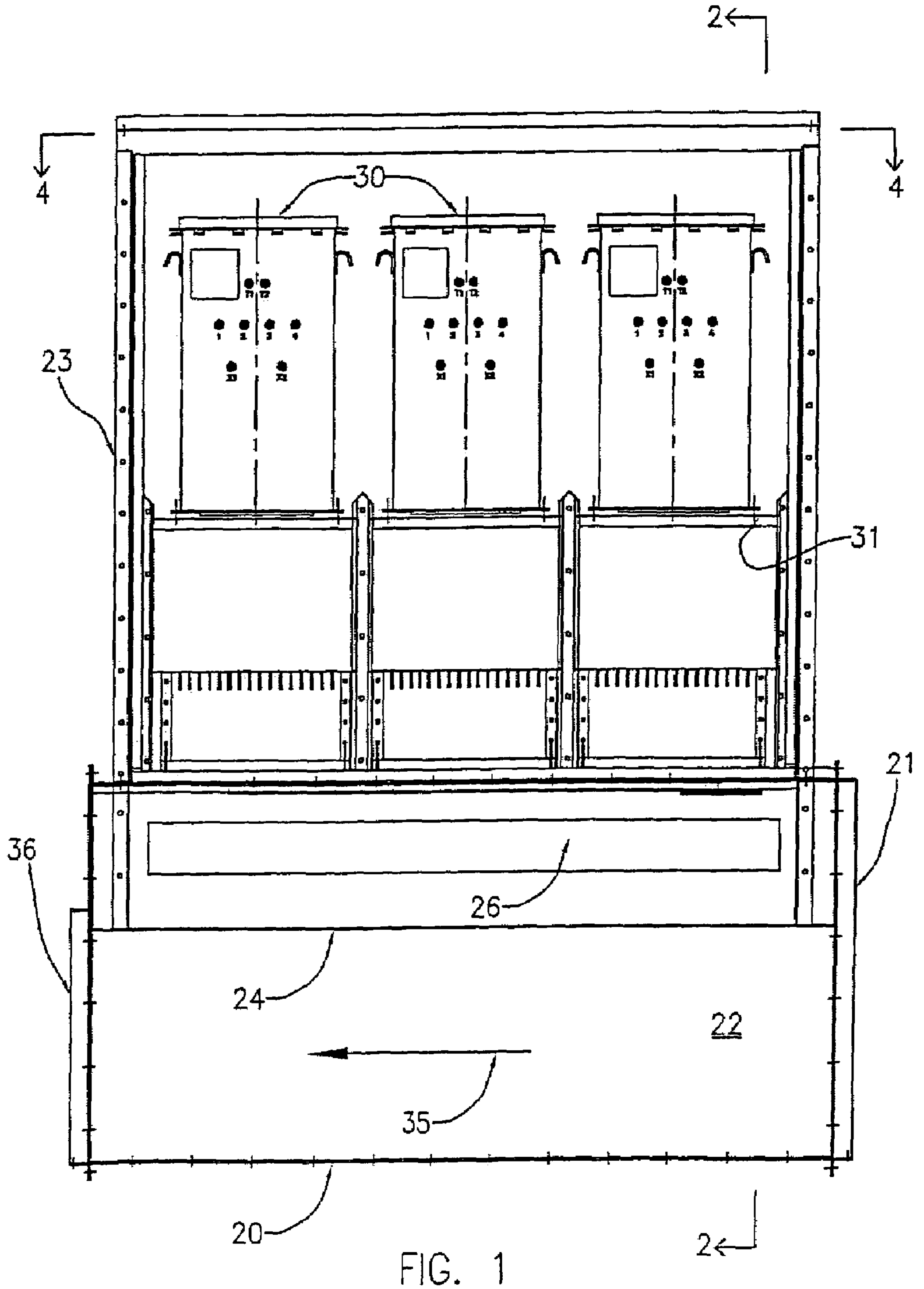

APPARATUS AND METHOD FOR THE TREATMENT OF ODOR AND VOLATILE ORGANIC COMPOUND CONTAMINANTS IN AIR EMISSIONS

BACKGROUND OF THE INVENTION

1. Field

The invention is in the field of treating emission gases from commercial and industrial processing wherein the gases used for such activity contain odors and/or volatile organic compound contaminants and/or hydrocarbon compounds, some of which are considered to be pollutants, and need to be removed from the gas before release of the gas to the atmosphere, and wherein the removal systems include non-thermal plasma (NTP) generation cells.

2. State of the Art

Odorous compounds, which could be organic or inorganic, herein called odors, and/or volatile organic compound (VOC) contaminants and/or hydrocarbon compounds herein called VOCs, emitted into the environment from a range of sources and processes can fill the air in and about residential neighborhoods. Such odors and/or VOCs can range from mildly offensive to intolerable levels. This is a common problem in areas that are in proximity to such sources. Examples of odorous sources include industries that process organic materials such as those that process and produce food for human consumption and industries that produce animal feed for the pet, fish, poultry and hog industry, and general agricultural applications. Other industries that process organic materials and release odors are those that process animal products including meat processing and rendering plants. Other organic odor sources include composting facilities, sewage treatment centers, garbage transfer stations and other industrial organic processing facilities. Generally, these industrial operations exhaust gases from cooking, grinding, drying, cooling, manufacturing, or reduction processes. These exhausts contain low-level concentrations of amines, aldehydes, fatty acids, and volatile organic compounds (VOCs) inherent in the materials processed and those are driven into the exhausted gas stream by the processing activity. These industries typically have large gas flow volumes, ranging from 1,000 to 250,000 actual cubic feet of gas per minute (ACFM) and above.

Agricultural activities that raise animals for food production, such as hog, poultry and dairy farms also emit strong and offensive odors into the environment from manure and barn ventilation odors and these can release offensive odors in sufficient quantity to fill many square kilometers under certain weather conditions.

Additional sources of environmental emissions exist that expel VOCs from non-organic processing, such as solvent evaporation from painting, cleaning, and other general industrial and commercial activities. Some VOCs may have little or no odor, but are considered atmospheric pollutants and/or carcinogens and need treatment to reduce them to harmless compounds. In the case where odors and VOCs are very potent, even concentrations in the parts per billion ranges can be offensive or exceed environmental emission limits and these also need treatment.

There are various systems designed to oxidize and/or reduce odorous and VOC emissions in commercial and/or industrial process gas that is to be emitted into the environment so that the emitted exhaust gas stream is within environmental regulatory limits. Some of these systems use non-thermal plasma (NTP) which is formed in dielectric barrier discharge (DBD) cells to create a wide range of activated species such as activated or Reactive Oxygen Species (ROS) that are then mixed with the gas to be treated so that the organic compounds that humans normally detect as odor, and/or VOCs, are oxidized and/or reduced, typically to carbon dioxide and water vapor, though other products are possible depending on the chemical characteristics of the pollutants, by the energetic ions in the ROS.

Activated species, as described herein, are chemical entities that are created in useful concentrations by the application of sufficient energy, such as through dielectric barrier discharge, to drive the molecules of interest from the ground state into the active state required, with the ground state being the normal state of these molecules typically at a nominal one-atmosphere pressure and 20 degrees C. (or whatever atmospheric and temperature conditions occur at the place of the odor, VOC, and/or organic compound emissions). Activated species are typically designated in literature by "•" as in O• for active oxygen (atomic oxygen in this case). Activation occurs through a number of mechanisms including direct electron collisions or secondary collisions, light absorption, molecular processes involving ionization, or internal excitation.

Dielectric Barrier Discharge (DBD) technology has been used to create the NTP that generates the activated species required for the purposes of this invention, and as such technology inherently limits the eV that can be applied to the gasses passing through the barrier, it is mainly the Reactive Oxygen Species (ROS) which include a range of hydroxyl radicals, that are involved in this case, though other electron activity assists in the process. For the activated species generated in the NTP field, those ROS species that have the highest reduction potential (between about 2.4 and 5.2 eV) have the shortest availability with half-life concentrations of less than about 100 milliseconds. These react with the odorous molecules that need high reduction potential oxidizers for decomposition. These high reduction potential radicals, and the reactions between these particles and the odorous molecules reacting with them, occur only in the NTP field, as these radicals quickly decay to less active species outside the NTP field. These radicals react with the odorous molecules by oxidation and reduction transformations so that the odorous molecules are transformed to simpler molecular forms that are no longer detectable as odor. Additional activity occurring within the NTP is that of electron collisions, bombardment and direct ionization, which acts on all molecules within the field, including the compounds of concern. This electron action, as well as creating the ROS of interest, also results in the disruption of the molecular bonds of the odor and/or VOC compounds, which also aids in the ROS activity of oxidation and/or reduction of the odor and/or VOC compounds. The NTP field also creates, within the ROS, a range of lower reduction potential radicals (between about 1.4 and 2.4 eV), and these are longer lived with half-lives from about 100 milliseconds to several minutes. These radicals react with the odorous molecules that respond to this level of reduction potential and oxidation for decomposition. These reactions occur both in the NTP field and in the air stream outside the NTP field, as those radicals are active longer and are carried outside the NTP field by the airflow through the DBD. These longer-lived radicals also effect their changes on the odorous and/or VOC compounds by oxidation and reduction transformations, so that the compounds of concern are transformed to simpler molecular forms that are no longer detectable as odor. Such transformations also ultimately convert the complex organic molecules and hydrocarbon molecules into the most simplified oxides, such as carbon dioxide, hydrogen dioxide (water), nitrogen (N2) and other simplified oxide forms of the elements that were in the original complex compounds.

Four oxidation states of molecular dioxygen are known: $[O_2]^n$, where n=0, +1, −1, and −2, respectively, for dioxygen, dioxygen cation, superoxide anion, and peroxide dianion (symbolically expressed as $^3O_2$, $^3O_2.^+$, $^3O_2.^-$, and $^3O_2.^2$). In addition, "common" oxygen in air, $^3O_2$, is in a "ground" (not energetically excited) state. It is a free "diradical" having two unpaired electrons. The two outermost pair of electrons in oxygen have parallel spins indicating the "triplet" state (the preceding superscript "3", is usually omitted for simplicity). Oxygen itself is a common terminal electron acceptor in biochemical processes. It is not particularly reactive, and by itself does not cause much oxidative damage to biological systems. It is a precursor, however, to other oxygen species that can be toxic, including: superoxide anion radical, hydroxyl radical, peroxy radical, alkoxy radical, and hydrogen peroxide. Other highly reactive molecules include singlet oxygen, $^1O$, and ozone, $O_3$.

Ordinary oxygen does not react well with most molecules, but it can be "activated" by the addition of energy (naturally or artificially derived; electrical, thermal, photochemical or nuclear), and transformed into reactive oxygen species (ROS). Transformation of oxygen into a reactive state from the addition of a single electron is called reduction (Eqn. 1). The donor molecule that gave up the electron is oxidized. The result of this monovalent reduction of triplet oxygen is superoxide, $O_2{\bullet}^-$. It is both a radical (•, dot sign) and an anion (charge of −1). Other reactive oxygen species known to be created with NTP, are noted below: (On the Ionization of Air for Removal of Noxious Effluvia [Air Ionization of Indoor Environments for Control of Volatile and Particulate Contaminants with Nonthermal Plasmas Generated by Dielectric-Barrier Discharge] Dr. Stacy L. Daniels, IEEE Transactions on Plasma Science, Vol. 30, No. 4, August 2002):

$$O_2+e\rightarrow O_2{\bullet}^- \quad \text{(Eqn 1)}$$

$$2O_2.^-+2H+\rightarrow H_2O_2+O_2{\bullet} \quad \text{(Eqn 2)}$$

$$O_2.^-+H_2O_2\rightarrow O_2+OH.+OH^- \quad \text{(Eqn 3)}$$

$$O_2.^-+H_2O\rightarrow O_2+HO_2.^-+OH.^- \quad \text{(Eqn 4)}$$

$$2O_2.^-+O_2+H_2O\rightarrow 2O_2+OH^-+OH. \quad \text{(Eqn 5)}$$

For any given reactive oxygen species (ROS), there exists some confirmed or postulated reaction scheme for inter conversion to any of the other species. In any event, several of the above reactive oxygen species may be generated in the NTP and react with odorous molecules to transform them into simpler molecules that are no longer detected as odorous.

Commercial and industrial volumes of contaminated gases to be treated normally have contaminants such as condensing water or other vapors and liquids, particles of some kind, or mixtures of both condensing fluids and particles. A problem arising from the use of dielectric barrier discharge (DBD) cells, generating the NTP for treating industrial scale flows of contaminated gases, is that after a period of use, sometimes only a matter of minutes, the contaminants inherent in these gases build up in the cells and cause electrical short circuits in the cells from hot electrodes, across the insulation and support frames, to the ground electrodes. Of course, this interferes with the designed electrical properties of the DBD cell and immediately destroys any ability for the DBD cell to generate the NTP. In this case, it is very likely DBD cell component damage has occurred as electrical arcs have very high temperatures and parts are usually damaged that have been in contact with the arc, and at the very least, cleaning of the DBD cell is necessary to restore the electrical dielectric integrity of the DBD cell, and damaged parts must be replaced.

SUMMARY OF THE INVENTION

According to the invention, a dielectric barrier discharge (DBD) cell used to create non-thermal plasma (NTP) particularly useful as part of apparatus for treating odorous gases and gases containing volatile organic compounds (VOCs) includes electrodes positioned within the cell to confine the area of NTP generation to keep the NTP away from the support frames and terminals for the electrodes so the frames do not suffer damage from the NTP and the terminals do not short out. Further, at least the portions of at least the hot electrodes in the cell where the contaminated gases to be treated pass over or along such electrodes are hermetically sealed so contaminants in the gases do not contact and build up on the "hot" electrodes. Further, the gas treating apparatus of the invention may be configured so that with gases that can be treated satisfactorily with relative low energy activated species, atmospheric air is passed through the NTP to generate the activated species and that air is then mixed with the gas to be treated where the longer lasting activated species react with the odorous molecules in the gas to treat the odor. With harder to treat gases, some or all of the gas to be treated passes through the NTP where the electron activity in the NTP field and the shorter lived, stronger energy activated species both act on the gas molecules to be treated. Generally larger capacity cells for generating NTP are necessary when all gas to be treated is passed through the cells.

The NTP Generation Cells

The DBD cells that generate the NTP, hereinafter referred to as DBD Plasma Generation Cells (PGC), or as DBDPGC, are planar in design and utilize two types of stainless steel electrodes or other conductor, where the thickness of the conductor ranges from a few microns up to 8 mm or even more, the height ranges from 10 mm up to 1000 mm or more, and the length ranges from 200 mm up to 2000 mm or more. There are two types of electrodes within the DBDPGC's, namely the "hot" electrodes, which have the high voltage connected to them and the "ground" electrodes, which are at ground potential, but can also be insulated and at a different phase for extra potential. The "hot" electrodes and the "ground" electrodes are shaped differently so that the NTP is isolated in the center and can only form in the area away from the electrode-supporting frame.

1. The "hot" electrodes are totally enclosed in a high dielectric, chemically resistant and high thermal resistance material, typically a ceramic material, such as borosilicate glass and must be sealed to ensure electrical isolation of the electrically conductive part within the "hot" electrode from the external environment of the ceramic surface and maintain the dielectric barrier. The seal of the "hot" electrodes within the dielectric isolation plates can be either high dielectric strength silicone, or the entire plate can be totally enclosed in a ceramic bonded directly to the conductor (except for the electrical connection to the conductor).
2. The ground electrodes are polished smooth and without burrs or high points that might concentrate the NTP and are usually uninsulated. In some cases, they are insulated almost exactly the same as the "hot" electrodes.

3. Each "hot" electrode has a ground plate facing it, spaced so that the surface of the electrode has a distance anywhere from 2 mm up to 25 mm or more, from the dielectric surface of the "hot" electrode. It is within this space where the NTP forms when the power is applied to the electrodes. The shaping of the "hot" and "ground" electrodes is such that no NTP can form near the support frame, while the spacing between plates is dictated by the airflow through the DBD and the differential pressure across the DBDPGC permitted.

The Electrical Activation of the DBDPGC's

The NTP within the DBDPGC forms with the application of high voltage alternating current between the "hot" and ground electrodes. This AC voltage needs to be anywhere from about 4,000 volts up to and above about 100,000 volts and at medium frequency, anywhere from about 50 Hz up to about 50,000 Hz depending on the application, cell geometry, and spacing.

The DBDPGC's are housed in a Plasma Containment Cabinet, which is usually stainless steel, but can be any other steel that can be securely grounded. All high voltage components are totally enclosed in this grounded cabinet to meet standard industrial safety codes. The DBDPGC's are normally grouped in sets of three and are powered by a three phase power supply.

Electrical Design

The three phase, high voltage, medium frequency power required by the BDBPGC's to create the NTP is provided by step up transformers, installed inside the cabinet where the BDBPGC's are. Normally the transformers have a primary voltage near that used by a typical industrial motor (480 volts, 3 phase).

An industrial invertor or mid frequency SCR power supply or other suitable AC power supply that can deliver the required frequencies, waveforms, voltage, and current, located in a separate control cabinet, powers the DBDPGC transformers. The voltage and frequency applied to the DBD, which controls the power level developed in the DBD, is varied by the width and frequency of the pulses in the case of a simple IGBT invertor, or by phase angle or duty cycle control in the case of an SCR supply, or by a changing frequency in the case of a swept frequency IGBT supply that seeks the resonance or off resonance of the DBD capacitance and high voltage transformer inductance, or by other means, and this voltage frequency combination is delivered to the high voltage transformer primary windings and this in turn adjusts the voltage produced by the high voltage transformer secondary windings, which is then applied to the DBDPGC, which has the effect of adjusting the level of the NTP produced in the DBD. Typically, a closed PID control loop that monitors the actual power output of the invertor is measured and controlled to a power level setpoint that can be cascaded from another control loop from an ozone sensor, or the setpoint can be manually entered.

Small units are usually single phase devices. These are, typically, but not limited to, 2 kilo volt amps (kva) and under. Larger units, up to and exceeding 250 kva, are typically three phase systems, though they can also be three phase input and single phase output. On a three phase system, the power supply used can be a modified three phase Variable Frequency Drive (VFD) motor inverter power section (three phase bridge rectifier, capacitor, and IGBT), if the VFD chosen can run a transformer load in unbalanced mode and can attain the wave shape and frequency required. In the case where a three phase inverter output is used, it is connected to three inductor/transformer groups with the primary side of the transformers wired in delta arrangement. The transformer high voltage secondary connections are wired in a center grounded wye configuration. The ground electrodes are connected to the center ground in most cases. In the case where other power alternatives are used and those have a three phase power input and a single phase power output, usually a single high voltage transformer is used, with one side of the high voltage secondary tied to ground potential and the ground electrode of the DBDPGC, while the high voltage side is connected to the "hot" electrodes of the DBDPGC.

THE DRAWINGS

Figure 2:
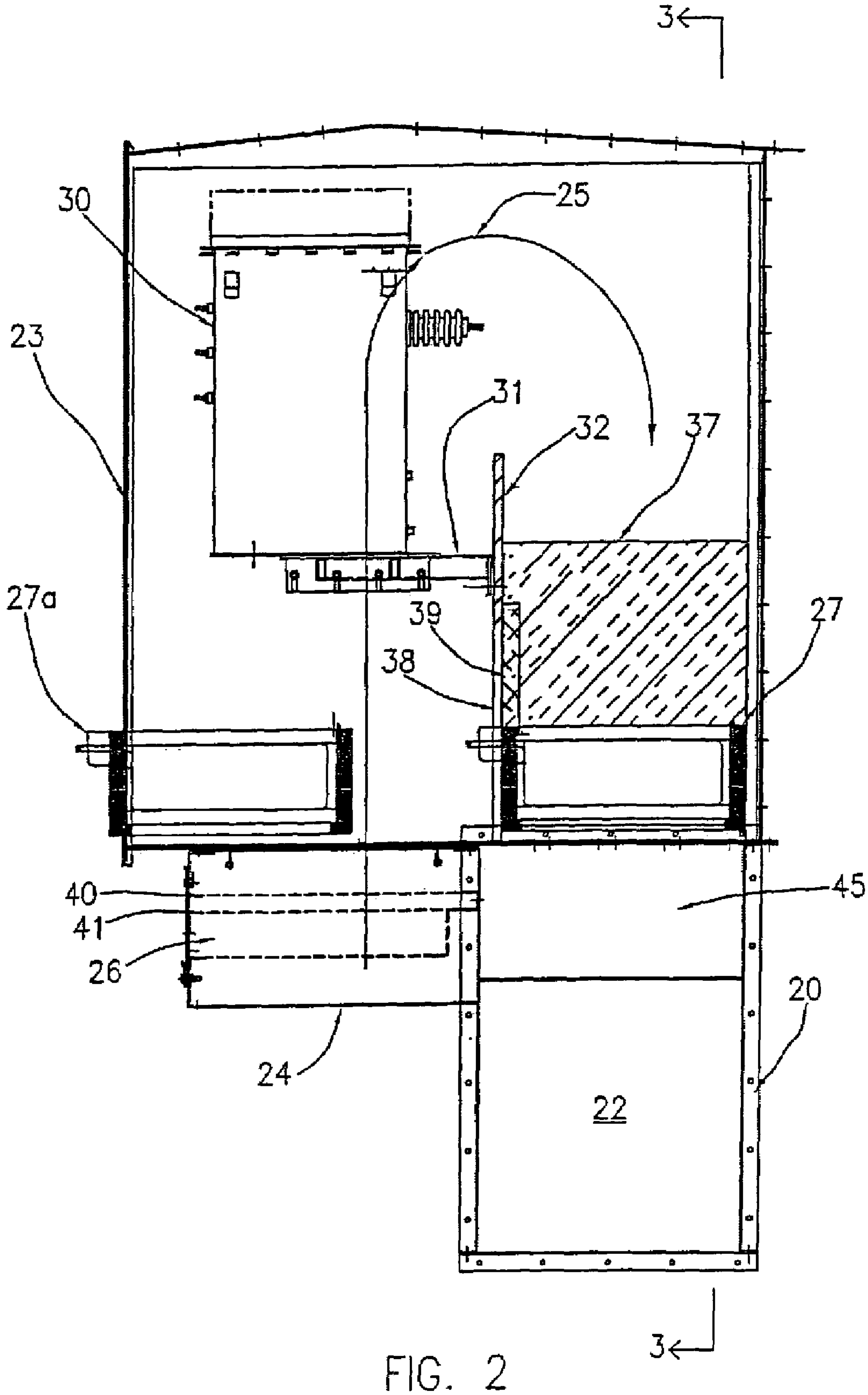
Figure 3:
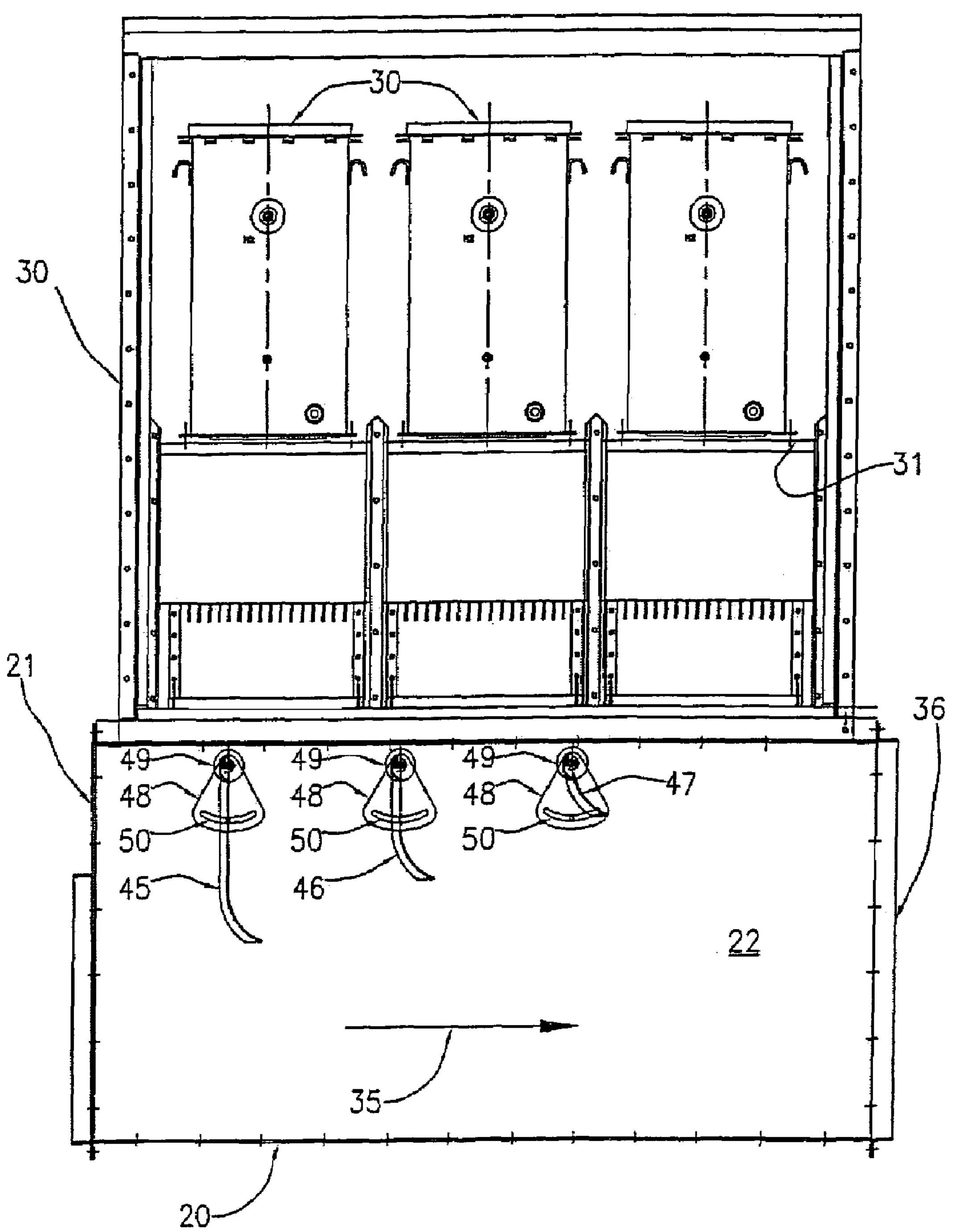
Figure 4:
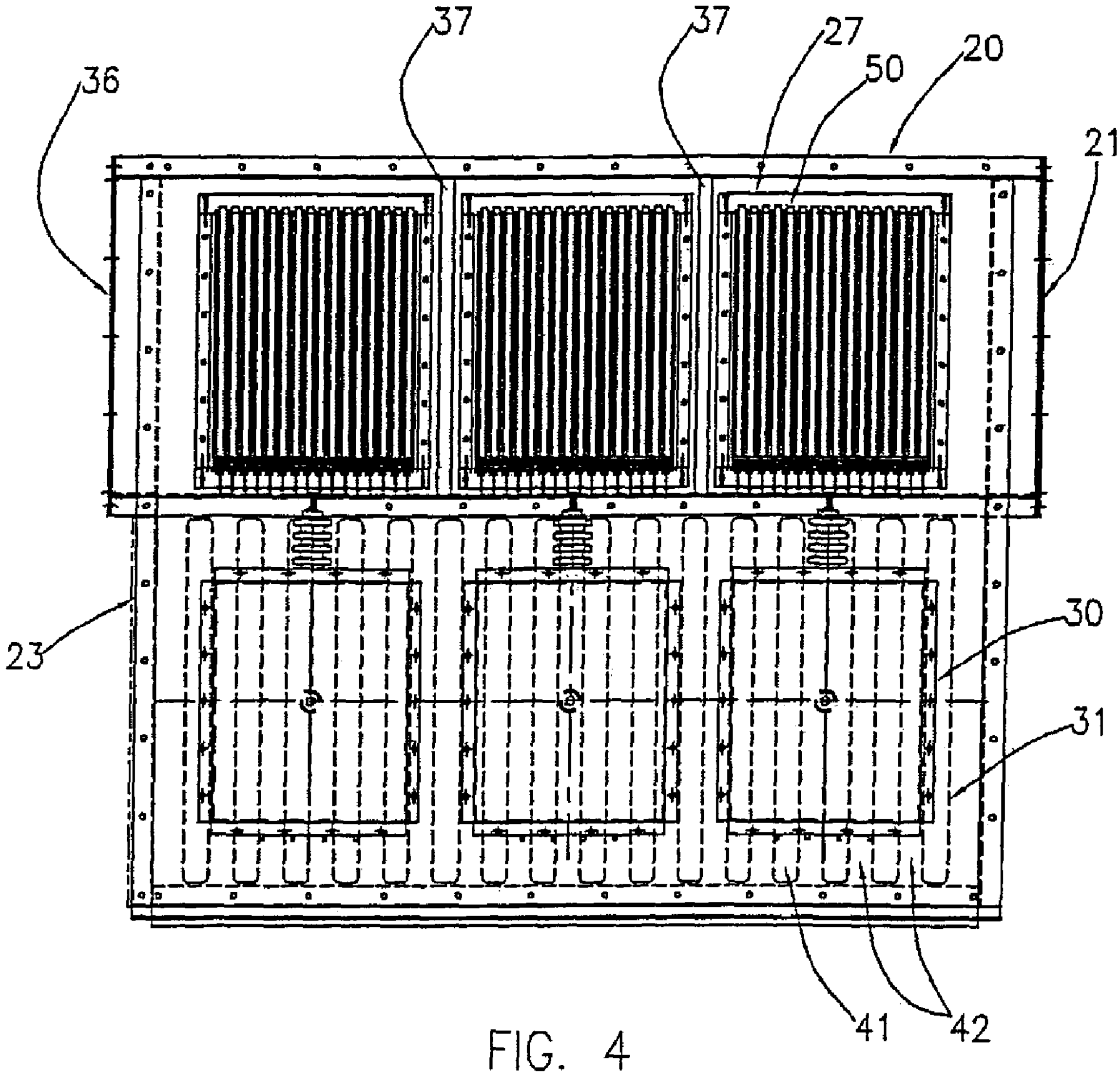
Figure 5:
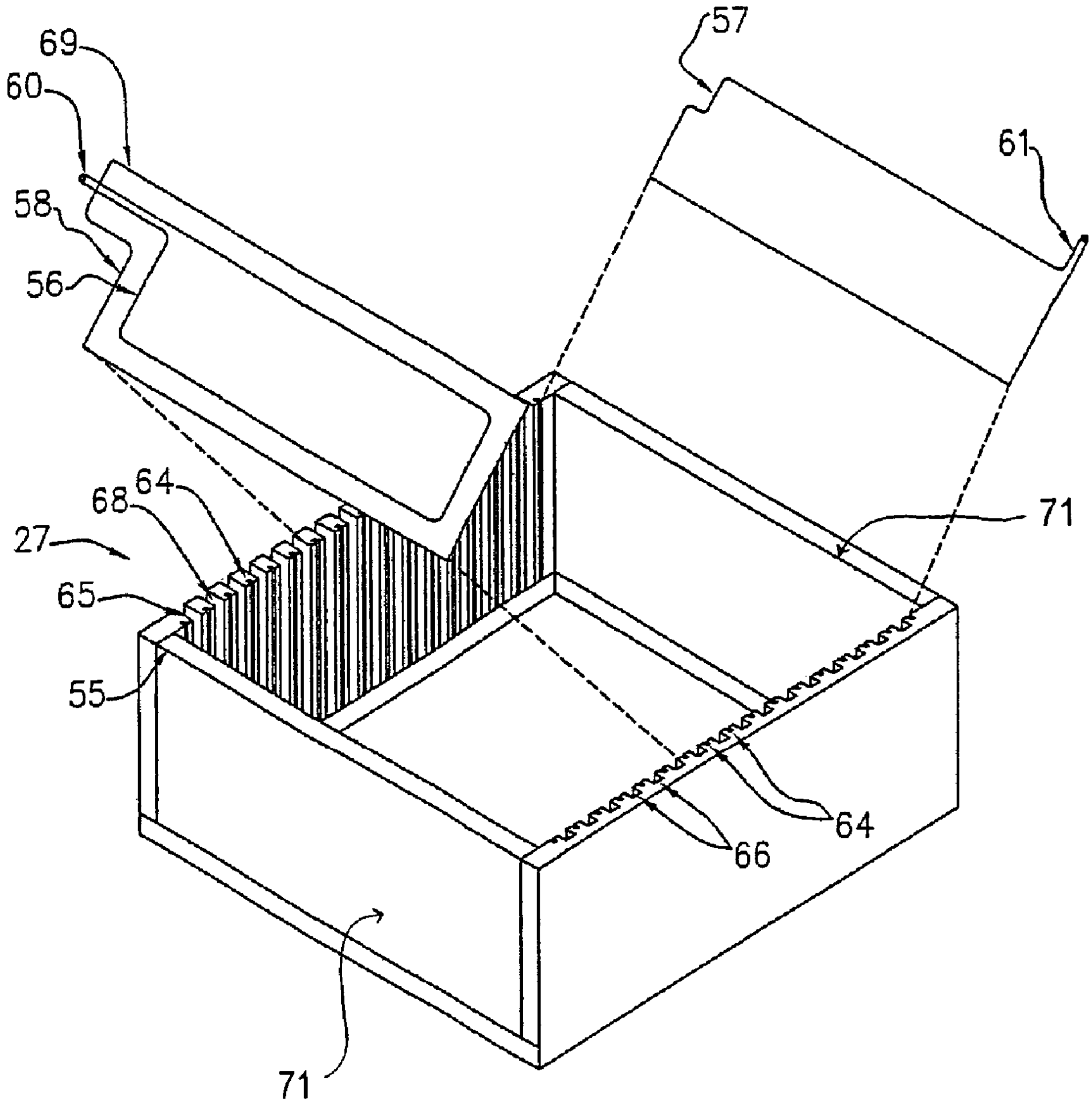
Figure 7:
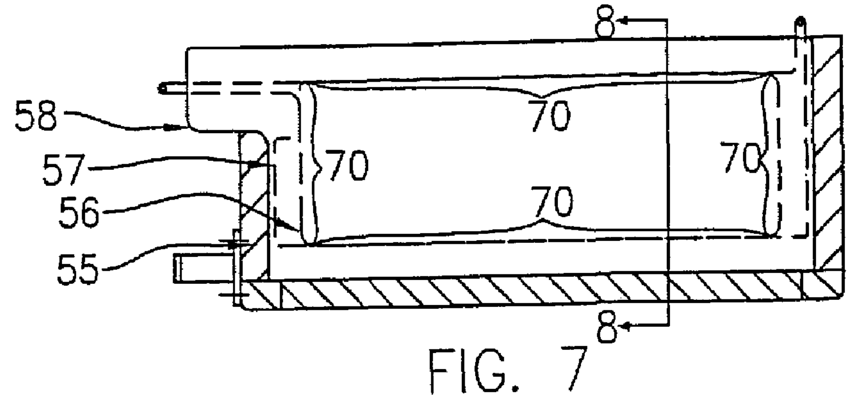
Figure 6:
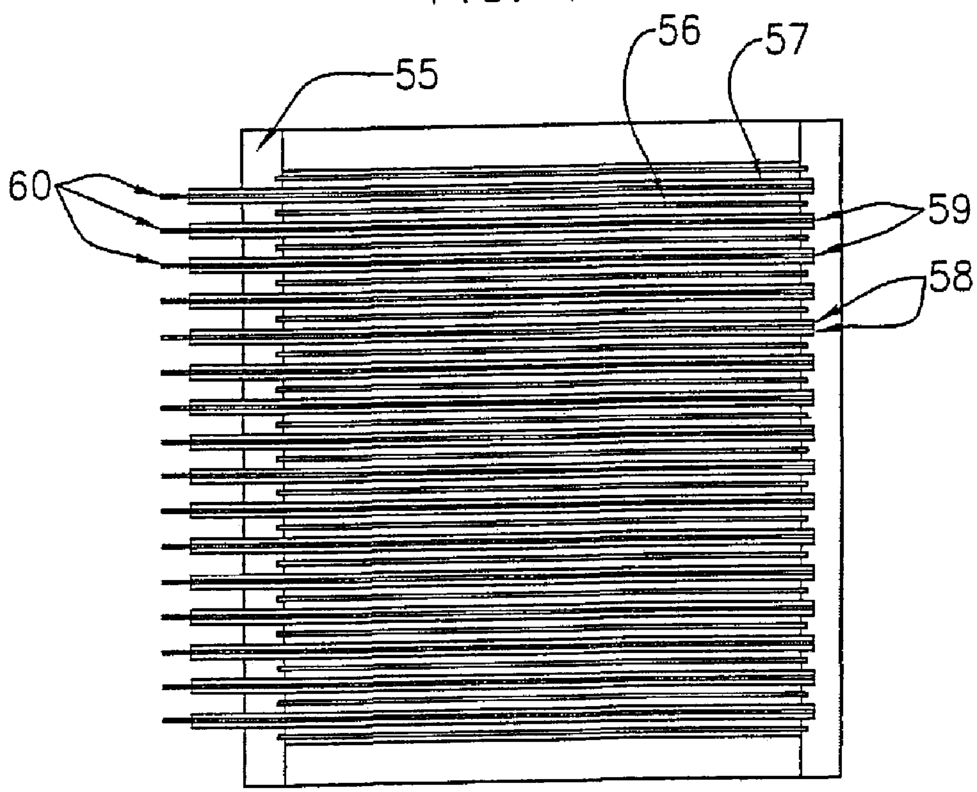
Figure 8:
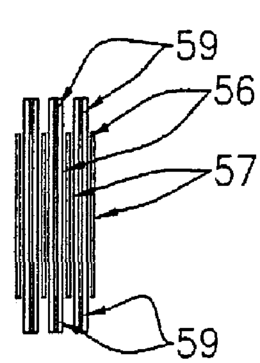

In the accompanying drawings, which show the best mode currently contemplated for carrying out the invention:

FIG. 1 is a side elevation of an apparatus of the invention with the upper side wall removed to show interior parts;

FIG. 2, a vertical section taken on the line 2—2 of FIG. 1;

FIG. 3, a vertical section taken on the line 3—3 of FIG. 2 through the side opposite that shown in FIG. 1;

FIG. 4, a horizontal section taken on the line 4—4 of FIG. 1;

FIG. 5, an exploded perspective view of a dielectric barrier discharge NTP generation cell (DBDPGC) housing showing how two of the electrodes would be positioned in the housing;

FIG. 6, a top plan view of a DBDPGC;

FIG. 7, a vertical section through the DBDPGC housing showing an electrode in elevation and a second electrode in broken lines; and FIG. 8, a fragmentary vertical section taken on the line 8—8 of FIG. 7, but showing only a few of the adjacent electrodes.

DETAILED DESCRIPTION OF THE ILLUSTRATED EMBODIMENTS

A preferred apparatus of the invention includes a housing that forms at least one gas flow passage therethrough and a dielectric barrier discharge NTP generation cell (DBDPGC) through which at least a portion of gas flows. The apparatus can be configured so that all of the contaminated gas to be treated flows through the DBDPGC, only a portion of the contaminated gas to be treated flows through the DBDPGC, or none of the contaminated gas to be treated flows directly through the DBDPGC, but atmospheric air flows as the gas through the DBDPGC and is then mixed with the contaminated gas to be treated to treat that gas. The gas passing through the DBDPGC is activated so that the activated gas from the DBDPGC, when mixed with gas that has not passed through the DBDPGC, treats the gas that has not passed through the DBDPGC. In instances where less than all of the contaminated gas to be treated flows through the DBDPGC, a mixing chamber is included in the apparatus to mix the gas that flows through the DBDPGC with the contaminated gas that does not flow through the DBDPGC. FIGS. 1–4 show a preferred apparatus wherein all of the contaminated gas to be treated, only a portion of the contaminated gas to be treated, or atmospheric air is passed through the DBDPGC and, if less than all gas to be treated is passed through the DBDPGC, the gas passing through the DBDPGC is then mixed with the contaminated gas to be treated that has not passed through the DBDPGC to treat that gas. As specifically configured and shown in FIGS. 1–4, the apparatus passes atmospheric air through the DBDPGC and then mixes such treated atmospheric air with the contaminated gas to be treated. The advantage of treating either atmospheric air or only a portion of the contaminated gas in the DBDPGC is that less gas flows through the DBDPGC and is treated directly in the DBDPGC meaning that the size and air flow capacity of the DBDPGC does not need to be as great as when all gas to be treated flows directly through the DBDPGC. This is the usual configuration when the contaminants are of a low concentration in a large gas flow stream, so that the system component sizing is determined by the amount and type of contaminant needing to be treated, rather than the total gas flow involved. In the case where the contaminant is more concentrated, or needing higher eV energy to oxidize and/or reduce the components of concern, or of a sufficiently low volume, then all gas can pass through the NTP field to take advantage of the higher electrical efficiency realized when all gas passes through the NTP field.

As shown in FIGS. 1–4, the apparatus includes a main flue 20, adapted to be connected at an inlet end 21 to the source of contaminated gas to be treated, such as odorous exhaust gas emanating from a pet food dryer. The flue 20 forms a mixing chamber 22 for mixing gas that passes through the DBDPGC with the gas to be treated flowing in flue 20. A housing or cabinet 23 supports and completely encloses the high voltage and DBDPGC components of the apparatus. The low voltage electrical components and controls, including the power supply, are housed in a separate standard electrical cabinet. Atmospheric air enters the apparatus through inlet 24, and flows as shown by arrow 25 in FIG. 2 through filter 26 and DBDPGC's 27. During such flow, the air passes around transformers 30, supported by brackets 31, FIG. 2, secured to and extending from wall 32, to cool the transformers. Immediately after passing through DBDPGC's 27, the air flows into mixing chamber 22 where the air mixes with the contaminated gas flowing through the chamber as represented by arrow 35, FIG. 1. The air from mixing chamber 22, FIG. 2, passes into an exhaust flue, not shown, connected to outlet end 36 of flue 20, for discharge to the atmosphere. Mixing of the gases will continue through the exhaust flue. Generally a fan will be provided in the exhaust flue to draw the gases through the DBDPGC's and mixing chamber. The apparatus shown includes three DBDPGC's 27, FIG. 4, mounted side-by-side to handle the air flow through the apparatus. Divider walls 37 form individual inlets for the respective DBDPGC's. Wall 32 has openings 38 therethrough so that the DBDPGC's 27 can be slid into place or removed, 27*a*, FIG. 2, for maintenance. The front of cover 23 is removable, and interlocked to disable power, to provide access to the transformers and allow removal of the DBDPGC's as shown in FIG. 2. DBDPGC 27*a* is a DBDPGC 27 during removal. Wall filler 39 blocks opening 38 above DBDPGC 27.

The housing or cabinet 23 may be made of various materials, to be compatible with the process gas, but preferably of electrically conductive material such as stainless steel or other steel that can be securely grounded. All high voltage components are totally enclosed in this grounded cabinet to meet applicable industrial safety codes.

Flow of air through inlet 24 and through DBDPGC's 27 is controlled by a pair of slatted plates 40 and 41, FIGS. 2 and 4, which slide over one another to open or close the passageway from inlet 24. As shown in FIG. 4, the slats 41 are positioned directly over slates 40 so that slats 40 are not visible under slats 41, and the maximum flow openings 42 are created for maximum air flow. Sliding slats 41 over slats 40 will close flow openings 42 to any desired degree to adjust the air flow through the DBDPGC's.

To ensure substantially equal air flow through each of the DBDPGC's and to provide for good mixing of air from the DBDPGC's with the contaminated gases to be treated, baffles 45, 46, and 47, FIG. 3, are adjustably secured in mixing chamber 22 by brackets 48. The baffles are pivotally secured at their mounting ends by pins 49 and can be rotated about the pivot to the extent allowed by bracket slots 50. A pin or stop extends from each baffle into respective slots 50. The baffles are of different lengths, with the longest baffle 45 located at the inlet end of the mixing chamber, and are adjusted to provide substantially equal air draw for each DBDPGC 27. The flaps also cause turbulence in the exhaust gases flowing through the mixing chamber and guide the air from the DBDPGC's into the exhaust gas stream to provide better mixing.

Rather than passing atmospheric air into inlet 24 and through DBDPGC's 27, with the apparatus shown in FIGS. 1–4, it is easy to split the contaminated gas stream to be treated to direct a portion of the contaminated gas to be treated to the inlet 24, rather than drawing in atmospheric air, or in addition to atmospheric air. Such gas to be treated is passed directly through the DBDPGC's and is then mixed with the remainder of the gas to be treated in the mixing chamber.

Also, all contaminated gas to be treated can be directed to inlet 24 with the inlet 21 to flue 20 blocked. Thus, all gas to be treated is passed into inlet 24 and passes though the "hot" and "ground" electrodes of a DBDPGC, so substantially all such gases are exposed directly to the NTP generated by the DBDPGC's. Flue 20 does not act as a mixing chamber in this configuration in the same way it does in the configurations previously described. Alternately, the DBDPGC's could be mounted in flue 20 so that all gas entering flue 20 through inlet 21 would pass directly through the DBDPGC's. In such case, inlet 24 would be blocked or the apparatus would be configured to eliminate inlet 24. As previously indicated, in the configuration of FIGS. 1–4, the gases entering inlet 24 pass around transformers 30 to cool them. The gasses passing through the DBDPGC's also serve the important function of cooling the electrodes of the DBDPGC's. Thus, when the gases to be treated are passed directly through the DBDPGC's, care must be taken to ensure that the required cooling of the components needing cooling takes place. Where the contaminated exhaust gases to be treated are hot, adequate flow must be provided for cooling or the contaminated exhaust gases may need some cooling prior to treatment. Components such as the transformers 30 can be moved out of the gas stream and located elsewhere for cooling.

In general, the configuration that passes all gas to be treated through the DBDPGC's is more efficient in terms of energy required to neutralize the odor molecules and the organic compounds in the gas to be treated, as the electron activity in the NTP field assists in breaking the molecular bonds of the compounds of concern by direct ionization and the extremely short lived, higher energy radicals, those with half lives of 100 micro seconds or less, are available to effect the oxidation and reduction of the odor molecules and the organic compounds. In the bypass or partial bypass modes, the direct ionization of the gas to be treated does not occur and the short lived radicals have decayed and are not assisting with the oxidation and reduction of the odor molecules and organic compounds in the mixing chamber. In cases where the gas to be treated needs unusually high energy to be oxidized and/or reduced, such as in exhaust gases that would otherwise have to be incinerated to treat the gas, all of such gas must pass directly through the NTP, as it is only within the NTP where the direct ionization occurs and the ROS with the highest energy levels are developed and can oxidize and reduce those compounds that need these conditions to disrupt the bonds that need a higher energy level to oxidize and/or reduce them.

While the actual treatment of the gas to be treated may be more efficient in terms of energy required to neutralize the odor molecules and the organic compounds in the gas when all gas is passed through the DBDPGC's, large volumes of gas would require large numbers of DBDPGC's to provide the capacity necessary to pass all gas to be treated through the DBDPGC's. Thus, in such instances, and where all the gas to be treated does not necessarily need to pass through the NTP field to be effectively treated, a smaller amount of atmospheric air, or a smaller portion of gas to be treated, can be passed through a fewer number of DBDPGC's and such gas then used to treat the remaining gas by the mixing described.

Each of the DBDPGC's 27 includes a rectangular frame 55, FIGS. 5–8, enclosing and supporting a plurality of alternating electrodes 56 and 57. Electrodes 56 will be referred to as "hot" electrodes and electrodes 57 will be referred to as "ground" electrodes. Generally the "hot" electrodes will be at either a positive or a negative voltage with respect to the "ground" electrodes which are generally at electrical ground, however, the "ground" electrodes do not have to be at electrical ground and all that is necessary is that there is a voltage difference between the "hot" and "ground" electrodes during operation of the DBDPGC. With an AC voltage, the difference in voltage between the "hot" and "ground" electrodes will vary between positive and negative voltages. The "hot" electrodes 56 are hermetically sealed by an insulating material such as a borosilicate glass 58, on both sides of the conductor plate 56. A silicone sealing material 59, FIGS. 6 and 8, seal all glass edges. An electrical connection tab 60 extends from the glass which seals the "hot" electrode 56. The "ground" electrodes include electrical connection tabs 61, FIGS. 5 and 7.

DBDPGC frame 55 is formed of a nonconductive material such as ceramic, Teflon, or other plastic and has small grooves 64 to receive and support "ground" electrodes 57 and larger grooves 65 and 66 which receive and support opposite sides of hermetically sealed "hot" electrodes 56 as sealed by glass 58. Grooves 66 receive the side of the hermetically sealed "hot" electrodes without the electrical connection tab 60, while grooves 65 with the top portions 68 thereof extending through the wall of the frame 55, receive the side of the hermetically sealed "hot" electrodes with an extended end 69 extending through the through portions 68. It should be noted that the material hermetically sealing the "hot" electrodes extends beyond the perimeter of the "hot" electrode 56 so that when installed in frame 55, the "hot" electrode 56 is held in the frame but spaced from the frame.

It has been found that the hermetic sealing of the "hot" electrodes is essential to satisfactory operation of the DBDPGC in most situations as the air and/or gases normally being treated usually have contaminants in the gas passing through the DBDPGC. This is true even when the gas is atmospheric air. Contaminants can be condensing water or other condensing vapors, some contaminants can be particles of some kind, or there can be a mixture of both condensing fluids and particles. When at least one set of the electrodes are not hermetically sealed, it has been found that after a period of time in operation, the contaminants cause electrical short circuits in the DBDPGC's from "hot" electrodes, across the insulation and support frames to the "ground" electrodes. Hermetically sealing at least the "hot" electrodes prevents short circuits from occurring as no medium can contact the actual "hot" electrode conductor. The hermetic sealing normally incorporates borosilicate glass 58 to cover the internal stainless steel or other conductive material of electrodes 56 on both sides, with high voltage silicone sealant 59 around all glass edges, filling all gaps to provide the sealing of the conductive electrode part 56 within the dielectric. Alternatively, hermetic sealing could involve completely enclosing the stainless steel portion of the electrode in a ceramic similar to borosilicate glass. The key consideration is that, except for the electrical connection tab, all other parts of the electrode has the hermetic seal and dielectric integrity maintained so no short circuit by any conductive means, fluid and/or particle or any other medium in contact with the wetted, hermetically sealed electrode surface can contact or otherwise connect to the conductive part within. Note the electrical connection tab is not "wetted" by the gas stream being treated The "ground" electrodes 57 can also be hermetically sealed. As indicated, the "ground" electrodes do not actually have to be at ground potential. Further, sealing all electrodes, both "hot" and "ground" electrodes will be required in cases where the contaminated gas to be treated is very aggressive and corrosive so would corrode exposed metal parts.

The physical matching of the electrodes is such that the NTP field formed between electrodes is confined to the area where the electrodes directly oppose each other through the dielectric medium and as such, this geometry serves to control the NTP and keep it away from the support frame so the frame does not suffer damage from the NTP field. The area of NTP generation is only the area enclosed by lines 70 in FIG. 7, i.e., the area inside the perimeter of the "hot" electrodes.

The excitation of the electrodes will vary according to the application. The "hot" electrodes and "ground" electrodes will have opposing polarity so that a NTP forms in the directly opposing areas between the electrodes. The electrodes can be excited by alternating current of either sine wave, square wave, or other wave shape as deemed effective, with the "hot" electrode being either positive or negative with respect to the "ground" electrode at any given instant of the alternating current cycle. The voltage between electrodes should be at least about 4,000 volts and usually will be in the range of between about 4,000 volts and about 100,000 volts, which is determined by the actual cell geometry required for a given application. The frequency should be between about 50 Hz up to about 50,000 Hz, and in some cases, higher.

It has been found convenient to group the DBDPGC's in groups of three where each DBDPGC is powered by one phase of a three phase power supply. For the embodiment shown, FIGS. 5 and 6, there are sixteen "hot" electrodes, with seventeen "ground" electrodes for each of three DBDPGC's, each DBDPGC powered by one phase of a three phase system. In this arrangement, the "ground" electrodes will actually be electrically connected to ground. When energized, these electrodes form the NTP field in the directly opposed areas between the electrodes, i.e., the area enclosed by lines 70 in FIG. 7. It has been found satisfactory to use a 2000 hertz sine wave, with a root mean square voltage of 18,000 volts. Alternatively, the ends 71, FIG. 5, of the DBDPGC frame 55 may be made of a conductive material similar to ground electrodes 57 and be electrically grounded so as to actually form the two end ground electrodes. In such situation, separate end ground electrodes 57 are not necessary and there will be one less ground electrode 57 than hot electrode 56 since the ends 71 replace the end ground electrodes 57.

A satisfactory power supply includes a transformer 30 for each DBDPGC powered by a frequency invertor that is capable of driving a transformer load. Depending upon the transformer used, an additional inductive reactance in series with the primary may be necessary so that the combined inductive reactance of the transformer and extra inductor nearly matches the "live" capacitance of the DBDPGC's, thus the system runs at "near" electrical resonance to get maximum power into the NTP. The term "live" capacitance is needed, as the capacitance of the "hot" and "ground" electrodes, when assembled in their frame and measured when the system is not powered, differs from that measured when the system is in operation. This is because the NTP changes the capacitance of the DBD when in operation so that must be matched by the inductance and frequency when in operation to achieve the desired NTP level.

The three transformers, one for each phase, have the primary windings connected in delta arrangement, with the three inductors, if necessary, in series with each transformer primary (through a PLC controlled contactor), while the transformer secondary windings are connected in grounded wye arrangement. In the event of any failure in one of the "hot" electrodes, the failed phase will go out of resonance operation, its power will drop and the current drop to the faulted phase will be detected. A programmable logic controller (PLC) monitors the difference and will disconnect the faulted phase. The remaining two phases will continue to operate at the power level set. In the event another "hot" electrode loses it's dielectric integrity and shorts out, that phase also will be disconnected by the PLC, so that the system can operate with two failed phases, on a single phase and single DBDPGC. The PLC monitors all currents to the primary of the transformers, selects the maximum current and modulates the signal to the invertor so that it remains at the setpoint entered. Changes in the gas being treated, such as temperature, humidity, plus the effects of component heating (transformers & inductors) can cause variations in the NTP developed and the power consumed, and this is held steady by the PID control algorithm calculated by the PLC.

The voltage to the primary of the transformers is varied by the width of the pulses delivered to the transformer, through the PLC PID algorithm that controls the power invertor and this in turn adjusts the voltage output of the transformers, hence to the "hot" and "ground" electrodes, which adjusts the level of the NTP produced. Typically, a closed PID control loop that monitors the actual power output of the invertor is measured and controlled to a power level setpoint that can be cascaded from another control loop from an ozone sensor, or the setpoint can be manually entered. Other system states, such as contactor status, for incoming power to the invertor, contactor to each of the transformer/invertor phases is also monitored and displayed by the PLC system. An important interlock monitored by the PLC is the DBDPGC differential pressure, which represents the gasflow through the DBDPGC's. Normally, this number (three) of DBDPGC's needs a minimum of 3000 ACFM of gas for electrode cooling at 70 degrees F., but a flow of 5000 ACFM is preferred. In this embodiment, this results in a differential pressure of 0.8 inches of water at 3000 ACFM and up to 1.5 inches of water at 5000 ACFM. The gas must be filtered to the extent of removing coarse particles and debris that might not pass between the gas flow space separating the "hot" and "ground" electrodes. Should the filter clog and the system draft not pass enough gas through the DBDPGC's, as indicated by a drop in differential pressure, the PLC will sense this and disable the power to the unit and present and alarm indication. This is needed, otherwise the DBDPGC's will overheat and the dielectric hermetic seal of the "hot" electrodes will break, destroying the dielectric integrity resulting in malfunction.

This embodiment as described will be rated for 25 kilowatts, measured as the power input to the invertor. Such system has been successfully used to treat odor from a pet food production facility, treating 20,000 ACFM of air that was used to dry and cool the feed.

Other embodiments are possible, with different DBDPGC dimensions, different airflows, different power densities and different power ratings. Single-phase units, for small airflows, are possible, typically using power from 500 watts up to approximately 3000 watts. Systems needing more power are typically powered with three-phase power, though some power supplies, accepting three phase in and single phase out, with different power electronics, such as SCR control and different IGBT arrangements and much higher frequencies, are possible.

In choosing a power and gas flow design to implement in a given application that needs odor/VOC abatement, the following considerations are important:

- Due to the wide ranging nature of differing industrial odors and the inexact science of determining the specific composition, potency, and the energy needed to oxidize and/or reduce a given mix of odorous complex organic molecules and/or VOCs, the systems are sized for unknown odor applications by operating a pilot sized system at the odor site.
- The pilot sized system has all the same flow paths as the full-scale system and is operated with a scaled down, known odorous and or VOC laden airflow from the process to be treated in concert with adjustable power and frequency levels with various air flow configurations to determine the optimum operation configuration, residence time and joules per liter density required to treat the gas.
- The determination of the appropriate mix and flow of odorous and/or non-odorous air to the pilot inputs depends on the nature and potency of the odors. In cases where the odor is highly concentrated and cannot be treated by any other means, except, possibly incineration, or if the odorous air flow can all pass through the DBDPGC cell, then it is best to configure all odorous air to pass through the DBDPGC.
- In applications where the odor is diluted and of a potency that does not need to be passed directly through the DBDPGC to be neutralized and the air stream is large, then the system may best pass only ambient air through the DBDPGC and inject the Activated Oxygen and Hydroxyl Species (AOHS) formed by the DBDPGC into the odorous air stream to provide the treatment. This configuration can also have odorous air pass through the DBDPGC in place of ambient, non-odorous air and achieve the same effect.
- In applications where some extremely high concentration or difficult to oxidize and/or reduce odors and/or VOCs need to be treated, that are only treatable otherwise through incineration, then such must pass entirely through the DBDPGC, as only the most active AOHS that operate entirely within the NTP field will neutralize such difficult odors or VOCs. In such applications, the lesser reactive AOHS species may still exist in the air exiting the DBDPGC, so it is useful to process some less concentrated, or odors that do not require the most energetic ROS to be treated at that point, and they are admitted to the Odor Removal System through the DBDPGC bypass input. In this configuration the pilot and full scale Odor Removal System will treat both odor sources at the same time.

Once an energy level has been established for given air flow rates to each system input for a given odor source or combination of sources, the full scale system can then be sized.

The system illustrated in FIGS. 1–4 is in a bypass system configuration, using a total of 5000 actual cubic feet of atmospheric air per minute (ACFM) through the DBD-PGC's, to be activated by the NTP to create the reactive oxygen species that are mixed with the gas to be treated. The treated gas volume can be from 5000 ACFM up to 50,000 ACFM, depending on the concentration of the odor or VOC needing treatment. This same configuration could also pass gas in a mix, in that some of the gas to be treated flows through the NTP field. In this configuration, the gas passing through the NTP field is not only treated to remove the pollutant of concern, but also is activated so that it can treat other air.

A further feature of the invention is that the efficiency of the odor removal can, with some odors and/or VOCs, be directly monitored and automatically controlled using an ozone monitor. Ozone is one of the longest-lived ROS species that are formed to treat the odorous gas and there is usually a small amount of residual ozone in the treated gas stream when enough ROS has been created to neutralize the odor and/or VOC levels in the case of odors and/or VOCs that are treatable with the longer lived ROS species. As the power applied to the DBDPGC's controls the amount of ROS produced (within the limits of the DBDPGC's power handling rating), the power can be modulated automatically to maintain a small residual ozone level, to match EPA or local authority guidelines. Since adjusting the power to the DBDPGC's controls the NTP level, hence the amount of ROS created, then the level of ROS required to treat any combination of gas flow and contaminant level is modulated so enough ROS is produced to fully oxidize and/or reduce the odors and/or VOCs contained in the gas stream and leave a small residual ozone in the discharge. In the case where the small residual ozone drops, it means that there is an increase in the odor and/or VOCs to be treated so the automatic control loop can increase power to the DBDPGC's to increase the NTP field which in turn generates more ROS species to meet the treatment demand. In the case where the residual ozone increases, then the odor and/or VOC load has decreased so the automatic control can reduce the power to maintain the small residual ozone setpoint to stay within authority limits for ozone emissions. In cases where the gas to be treated must all pass through the NTP field for effective treatment, due to the high energy requirement of the ROS species, then it might not be possible to close the control loop using ozone as the process variable, as the gas being treated would not consume the lower energy ROS species of which ozone is a member. In such cases a manual operation level might have to be set.

Also incorporated into the control of this invention is a Programmable Logic Controller (PLC) that interlocks all safety devices and controls the on/off functions of the system according to factory needs. In other words, it will automatically shut down when the factory halts production and/or isolate a fault and give an alarm message if such occurs in the system.

The system of the invention can be added on to existing factories or integrated as part of new plant design. The changes in equipment are minimal to integrate this technology into a factory and the only operating consumable commodity is electricity. Further, the technology is scalable to any size from small domestic sized units for kitchen odors of a few hundred ACFM, all the way to the largest factories that release tens of thousands of ACFM and more of odorous and/or VOC pollutant laden air into the environment. When large volumes of air, and/or extremely high oder load in combination with large air volumes must be treated, multiple units can be combined in parallel to treat the air.

While the invention has been described as apparatus for treatment of odor and volatile organic compound contaminants in gas emissions, the invention can be used in a variety of other applications to oxidize and/or reduce a compound or compounds of concern to a desired form. One such application would be to reduce the hydrocarbon content in air emission applications to an acceptable level prior to release into the atmosphere. Gas fumes such as combustibles and even H2S from oil wells or other processes can be oxidized and reduced using this technology that otherwise would require burning or flaring to prior to being discharged into the atmosphere. In many cases, additional fuel, such as propane, is needed to keep a flare in combustion when the concentration of combustibles in the gas to be emitted falls below the ignition point. With this technology, an ignition concentration is not required to fully oxidize and reduce the gas, the NTP is able to fully oxidize and reduce the gas to be treated regardless of the hydrocarbon level. Other hydrocarbon compounds, such as those containing chlorine and fluorine are also treatable by this invention.

Whereas the invention is here illustrated and described with reference to embodiments thereof presently contemplated as the best mode of carrying out the invention in actual practice, it is to be understood that various changes may be made in adapting the invention to different embodiments and to the availability of improved materials (power supplies or ceramics for example) without departing from the broader inventive concepts disclosed herein and comprehended by the claims that follow.

We claim:

1. Apparatus for treatment of odor and volatile organic compound contaminants in gas emissions, comprising:

a dielectric barrier discharge non-thermal plasma (NTP) generation cell having a gas flow path therethrough, said cell having a plurality of electrically hot electrodes and ground electrodes positioned in the gas flow path so that gas flowing in the gas flow path will flow across a portion of these electrodes, at least the hot electrodes being hermetically sealed across the gas flow portion of the electrodes;

a cell gas inlet leading to the gas flow path through the cell; and a cell gas outlet for discharging gas that has passed through the cell.

2. Apparatus for treatment of odor and volatile organic compound contaminants in gas emissions according to claim 1, wherein the cell gas inlet is connected to a source of gas emissions, and the cell gas outlet discharges treated gas for discharge to the atmosphere.

3. Apparatus for treatment of odor and volatile organic compound contaminants in gas emissions according to claim 1, additionally including a gas mixing chamber having a first mixing chamber gas inlet connected to the cell gas outlet and a second mixing chamber gas inlet, the mixing chamber mixing gas entering the chamber from the first and second mixing chamber gas inlets, and a mixing chamber gas outlet for discharging gas that has passed through the mixing chamber.

4. Apparatus for treatment of odor and volatile organic compound contaminants in gas emissions according to claim 3, wherein the gas to be treated is divided into two portions, one portion being directed to the cell gas inlet to be treated in the cell and the other portion being directed to the second mixing chamber gas inlet.

5. Apparatus for treatment of odor and volatile organic compound contaminants in gas emissions according to claim 3, wherein the gas to be treated is directed to the second mixing chamber gas inlet and atmospheric gas is directed to the cell gas inlet.

6. Apparatus for treatment of odor and volatile organic compound contaminants in gas emissions according to claim 1, wherein the NTP generation cell comprises a plurality of NTP generation cells arranged in parallel configuration.

7. Apparatus for treatment of odor and volatile organic compound contaminants in gas emissions according to claim 6, wherein three NTP generation cells are arranged in parallel.

8. Apparatus for treatment of odor and volatile organic compound contaminants in gas emissions according to claim 7, wherein each of the three NTP generation cells are powered by one phase of a three phase power source.

9. Apparatus for treatment of odor and volatile organic compound contaminants in gas emissions according to claim 1, wherein the hot electrodes are hermetically sealed with a ceramic material.

10. Apparatus for treatment of odor and volatile organic compound contaminants in gas emissions according to claim 9, wherein the ceramic material is a borosilicate glass.

11. Apparatus for treatment of odor and volatile organic compound contaminants in gas emissions according to claim 10, wherein the borosilicate glass is in the form of sheets placed on opposite flat sides of the electrode and the edges of the glass sheets are sealed with an electrically insulating material.

12. Apparatus for treatment of odor and volatile organic compound contaminants in gas emissions according to claim 11, wherein the electrically insulating material is a high voltage silicone sealant.

13. Apparatus for treatment of odor and volatile organic compound contaminants in gas emissions according to claim 1, wherein the electrodes of the NTP generating cell are positioned in alternating relationship in a non-conductive rectangular frame.

14. Apparatus for treatment of odor and volatile organic compound contaminants in gas emissions according to claim 13, wherein the hot electrodes each have a perimeter and are hermetically sealed by sealing material which extends beyond the perimeter of the hot electrode, the hot electrodes being held in the frame by the sealing material extending beyond the perimeter of the electrode so each hot electrode is held in the frame spaced from the frame.

15. Apparatus for treatment of odor and volatile organic compound contaminants in gas emissions according to claim 14, wherein a NTP field is generated between electrodes when power is applied to the electrodes and the perimeter of the hot electrodes establishes a perimeter for the NTP field generated between electrodes substantially equal to the perimeter of the hot electrodes, whereby the NTP field is kept away from the frame.

16. Apparatus for treatment of odor and volatile organic compound contaminants in gas emissions according to claim 15, wherein there is one more ground electrode than hot electrode.

17. Apparatus for treatment of odor and volatile organic compound contaminants in gas emissions according to claim 1, wherein power is applied to the electrodes to generate a NTP field between the electrodes, and wherein the power is an AC voltage of between about 4,000 volts and about 100,000 volts at a frequency of between about 50 Hz and about 50,000 Hz.

18. Apparatus for treatment of odor and volatile organic compound contaminant in gas emissions according to claim 1, additionally including a dielectric barrier discharge NTP generation cell power control system and an ozone sensor in the treated gas leaving the apparatus, the ozone sensor providing an indication of the ozone content of the treated gas, the ozone content of the treated gas being indicative of the extent of treatment of the gas, the indication of ozone content of the treated gas being transmitted to the control system to control the power provided to the cell.

19. Apparatus for treatment of odor and volatile organic compound contaminants in gas emissions, comprising:

a dielectric barrier discharge NTP generation cell having a gas flow path therethrough, said cell having a plurality of electrically hot electrodes and ground electrodes positioned in the gas flow path so that gas flowing in the gas flow path will flow across a portion of these electrodes;

a cell gas inlet leading to the gas flow path through the cell;

a cell gas outlet for discharging gas that has passed through the cell;

a gas mixing chamber having a first mixing chamber gas inlet connected to the cell gas outlet and a second mixing chamber gas inlet, the mixing chamber mixing gas entering the chamber from the first and second mixing chamber gas inlets; and a mixing chamber gas outlet for discharging gas that has passed through the mixing chamber, said inlets being arranged so that the cell gas inlet is selectively connected to a source of contaminated gas to be treated, to a source of atmospheric air, or to sources of both contaminated gas and atmospheric air.

20. A dielectric barrier discharge non-thermal plasma generation cell, comprising:

a plurality of electrically hot electrodes;

a plurality of ground electrodes;

a fluid flow path formed between said ground electrodes and said hot electrodes so that a fluid flowing in the fluid flow path will flow across a fluid flow portion of the electrodes;

dielectric material hermetically sealing each of the plurality of hot electrodes across the fluid flow portion of the electrodes;

a cell fluid inlet leading to the fluid flow path through the cell; and a cell fluid outlet for discharging fluid that has passed through the cell.

21. A dielectric barrier discharge non-thermal plasma generation cell according to claim 20, wherein the electrodes of the non-thermal plasma generating cell are positioned in alternating relationship in a non-conductive rectangular frame.

22. A dielectric barrier discharge non-thermal plasma generation cell according to claim 21, wherein the hot electrodes each have a perimeter and are hermetically sealed by sealing material which extends beyond the perimeter of the hot electrode, the hot electrodes being held in the frame by the sealing material extending beyond the perimeter of the electrode so each hot electrode is held in the frame spaced from the frame.

23. A dielectric barrier discharge non-thermal plasma generation cell according to claim 22, wherein a non-thermal plasma field is generated between electrodes when power is applied to the electrodes and the perimeter of the hot electrodes establishes a perimeter for the non-thermal plasma field generated between electrodes substantially equal to the perimeter of the hot electrodes, whereby the non-thermal plasma field is kept away from the frame.

24. A dielectric barrier discharge non-thermal plasma generation cell according to claim 23, wherein there is one more ground electrode than hot electrode.

25. Apparatus for treatment of odor and volatile organic compound contaminants in gas emissions according to claim 20, wherein power is applied to the electrodes to generate a non-thermal plasma field between the electrodes, and wherein the power is an AC voltage of between about 4,000 volts and about 100,000 volts at a frequency of between about 50 Hz and about 50,000 Hz.

26. A method of treating odor and volatile organic compound contaminants in gas emissions comprising:

passing a gas through a dielectric barrier discharge non-thermal plasma generation cell to create a range of reactive oxygen species in the gas which causes oxidation and/or reduction of odor causing molecules and volatile organic compounds; and mixing the gas to be treated with the gas having been passed through the dielectric barrier discharge non-thermal plasma generation cell to allow the reactive oxygen species to react with the odor causing molecules and volatile organic compounds in the gas to be treated.

27. A method of treating odor and volatile organic compound contaminants in gas emissions according to claim 26, wherein the gas passed through the dielectric barrier discharge non-thermal plasma generation cell includes at least a portion of the gas to be treated.

28. A method of treating odor and volatile organic compound contaminants in gas emissions according to claim 26, wherein the gas passed through the dielectric barrier discharge non-thermal plasma generation cell is atmospheric air.

* * * * *